J. W. JESSOP.
Cultivator.

No. 85,387.

Patented Dec. 29, 1868.

J. W. JESSOP, OF HARVEYSBURG, OHIO.

Letters Patent No. 85,387, dated December 29, 1868.

IMPROVEMENT IN CULTIVATORS.

The Schedule referred to in these Letters Patent and making part of the same.

*To all whom it may concern:*

Be it known that I, J. W. JESSOP, of Harveysburg, in the county of Warren, and State of Ohio, have invented a new and useful Improvement in Cultivators; and I do hereby declare that the following is a full, clear, and exact description thereof, which will enable others skilled in the art to make and use the same, reference being had to the accompanying drawings, forming part of this specification, in which—

Similar letters of reference indicate corresponding parts.

Figure 1:
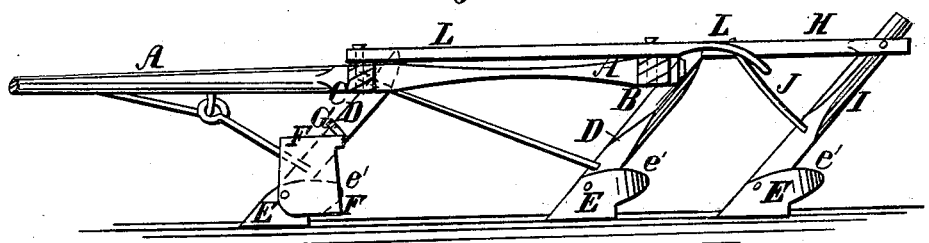
Figure 1 is a vertical longitudinal section of my improved cultivator, taken through the line $x\ x$, fig. 2.

My invention has for its object to furnish an improved cultivator, which shall be so constructed and arranged that it may be easily adjusted for use to cultivate corn, or cover wheat, as may be desired, and which shall at the same time be simple in construction and effective in operation.

It consists in the construction and combination of the various parts, as hereinafter more fully described.

A is the tongue, to the rear end of which is attached a cross-beam, B.

C is a cross-beam, which is made shorter than the rear cross-beam B, and which is attached to the tongue A, at such a distance in front of the cross-beam B, that the plows, in operating, will not interfere with each other.

To the cross-beams B and C, at or near their ends, are attached the standards D, having mould-board plows, E, made in substantially the manner shown in the drawings.

When used for cultivating very small corn, the forward plows are made without the rearwardly-projecting wings $e'$, so as not to cover the corn with the soil.

The standards D are detachably secured to the cross-beams B and C, so that they may be readily shifted from one side of the machine to the other, according as it is desired to turn the soil to or from the corn.

Figure 2:
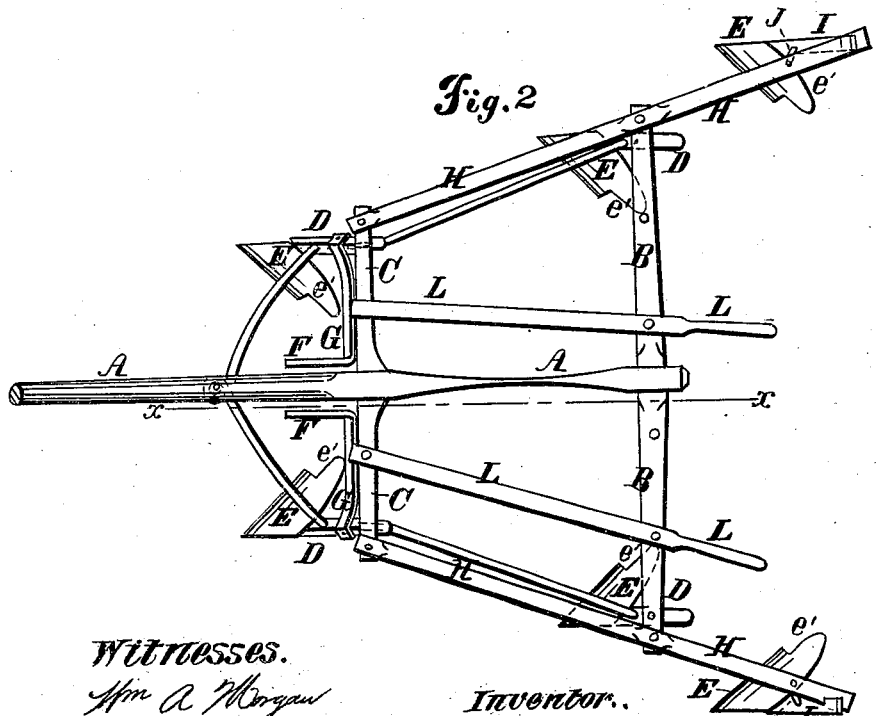
Figure 2 is a top or plan view of the same.

F are guard-plates, attached to and suspended from the projecting ends of the arms G, the other ends of which are attached to the forward standards D, as shown in figs. 1 and 2.

The guard-plates F are suspended in such a position that they may pass along upon each side of the plants, and prevent said plants, when small, from being covered or injured by having soil thrown against or upon them by the forward plows.

H are beams, removably attached to the ends of the cross-beams B and C, and the rear ends of which project in the rear of the rear cross-beam B.

To the rear ends of the beams H are attached the standards I, which are strengthened by the braces J, and to the lower ends of which are attached the mould-plows E, as shown in figs. 1 and 2.

By shifting the beams H, with their standards and plows, from one side of the machine to the other, the soil may be turned in either direction, as may be desired.

The beams H, with their standards I and plows E, are designed for use in covering wheat, and do not require to be used in cultivating corn.

L are the handles, the forward ends of which are pivoted to the forward cross-beams C, at points about equally distant from the centre and ends of said cross-beam.

The rear parts of the handles L are detachably secured to the rear cross-beam B, by bolts or equivalent detachable means, as shown in figs. 1 and 2, so that the said handles L may be adjusted in an inclined position, as shown in fig. 2, when plowing corn, enabling the plowman to walk upon one or the other side of the row being cultivated, as may be desired.

When covering wheat, the handles L may be adjusted in positions parallel with the line of draught, enabling the driver to walk directly in the rear of the central part of the machine.

The plows E are made in about the form and manner shown in figs. 1 and 2; that is to say, they are made with a sharp point, and with their lower or horizontal edge long and inclined forward, so as to cut off the weeds or grass that may be growing between the rows at the same time that it raises the soil, which said soil is moved laterally, and turned over, either toward or from the rows, according as the said plows are adjusted.

I am aware that adjustable beams H and standards D are not in themselves new, and I do not therefore claim them; but What I do claim as new, and desire to secure by Letters Patent, is—

The provision, in a cultivator, of the adjustable long beams H, provided with mould-plows, cross-beams B and C, and standards D, also provided with plows, when the several parts, herein named, are constructed, combined, and arranged, as herein set forth, for the purpose specified.

J. W. JESSOP.

Witnesses:
ISAAC H. ANTRAM,
A. T. SABIN.